Nov. 2, 1971    J. S. CONRAD    3,616,551
TEACHING AID

Filed Oct. 15, 1969    3 Sheets-Sheet 1

JETTA SUE CONRAD
*INVENTOR*

BY
ATTORNEY

Nov. 2, 1971 J. S. CONRAD 3,616,551
TEACHING AID

Filed Oct. 15, 1969 3 Sheets-Sheet 2

JETTA SUE CONRAD
INVENTOR

BY *C. Walter Mortenson*

ATTORNEY

Nov. 2, 1971   J. S. CONRAD   3,616,551
TEACHING AID

Filed Oct. 15, 1969   3 Sheets-Sheet 3

JETTA SUE CONRAD
*INVENTOR*

BY *Walter Mortenson*

ATTORNEY

United States Patent Office 3,616,551
Patented Nov. 2, 1971

3,616,551
TEACHING AID
Jetta Sue Conrad, 105 Glenrock Drive,
Claymont, Del. 19703
Filed Oct. 15, 1969, Ser. No. 866,647
Int. Cl. G09b *17/00*
U.S. Cl. 35—35 J                                6 Claims

ABSTRACT OF THE DISCLOSURE

A device for use in the teaching of reading and writing is provided. It is a three-dimensional element made up of or capable of being made up of a letter or a combination of letters. These comprise long vowels, vowel variants, short vowels, dipthongs, blends, suffixes, prefixes, digraphs, consonants and the like all of which, as separate elements, are capable of being placed in or on a base which is representative of a line upon which writing is to be placed. The base and the letter-carrying element have co-acting parts which allow the user to place them together in a fixed position. This allows the user to pick up, handle and move about the new combination of letters he has just made. While the parts are three dimensional, the thickness is small, being in the order of that of ordinary paper stock so that the combinations made lie flat much like ordinary written or printed matter.

---

In order to make people more creative it is necessary to develop their reading and writing skills to higher and higher levels. Today there is an ever increasing effort on the part of the educators and those being educated to bring this about. As a result, there are many new visual aids being made available in the educational field.

In spite of this there is an urgent need for an effective device which is simple to understand and easy to handle and yet is efficient and which allows the user to assemble or make words in the process of learning or teaching reading and writing through phonetic linguistics. It is also desired that the product formed look like a line on which is written or printed a word or words.

Thus, it is an object of this invention to provide an aid for use in teaching reading and writing which simulates writing, yet is in a physical form which allows the user to move it about for rearranging and the like, creating many words with the interchange of letters. A further aim is the provision of a series of letters which can be used in co-action with other letters to place resultant combinations into a fixed form. Another purpose is the creation of a plurality of units of letters or combination of letters each of which units is provided with a means for anchoring it to a similar unit or a base line fixed to the unit. Another purpose is to provide a guide for students which permits independent manipulation of certain groups of letters within a set pattern and to provide such patterns each of which represents a specific speech sound. These and other objectives of this invention will appear hereinafter.

The objectives of this invention are accomplished by breaking down words into their most common parts such as long vowels, vowel variants, short vowels, dipthongs, common blends, digraphs and consonants. Each letter or combination of letters has an element affixed to it which enables the user to place any combination of letters into a fixed relationship with any other of the letters or combination of letters of this invention. For example, a letter or a combination of letters can be integral with a base which base is adapted to receive other letters that have on the ends thereof a gripping element. The gripping element may be somewhat like a paperclip mechanism, or it may be a protruding element that fits into a notch contained in the base to which it is to be affixed. The base element is a unit which represents a line upon which a word is to be written, and it may or may not, but generally does, have a letter or a group of letters integrally attached to it to form a set pattern. Each set pattern represents a specific sound used in talking, as for example, a long vowel pattern, ī, as in "tie" and a short vowel pattern, ă, as in "at." These and other examples can be clearly seen in the tables below.

This invention will be further understood by reference to the discussion below and to the drawings, which are given for illustrative purposes and are not limitative, the drawings being:

As one feautre of this invention, the letters of the alphabet are broken down into the common categories such as those enumerated above. To demonstrate this, the following table is given:

| Long vowels | Vowel variants | Short vowels | Dipthongs | Blends | | Other linguistic patterns |
|---|---|---|---|---|---|---|
| u e | old | a | oi | bl | st | ep |
| a e | ear | e | oy | cr | str | in |
| o e | igh | i | ou | br | squ | at |
| i e | eigh | o | ow | cl | tr | om |
| ai | ar | u | | dr | thr | og |
| ea | oo | | | fl | sk | ob |
| ee | or | | Digraphs | gr | sc | |
| ue | are | | sh | pl | sp | |
| oa | ir | | qu | fr | sm | |
| ie | ur | | th | gl | sl | |
| oe | er | | ch | pr | sn | |
| o | | | ck | spr | spl | |
| e | | | ph | | | |
| y | | | wh | | | |
| ay | | | | | | |

Each base pattern represents a specific sound or a specific choice of a group of sounds. As the "igh" sound is ī; the "eigh" sound is ā; "oi" and "oy" have the same sound as in "oil" or "boy." The digraphs and blends both have specific and constant sound patterns.

Figure 1:
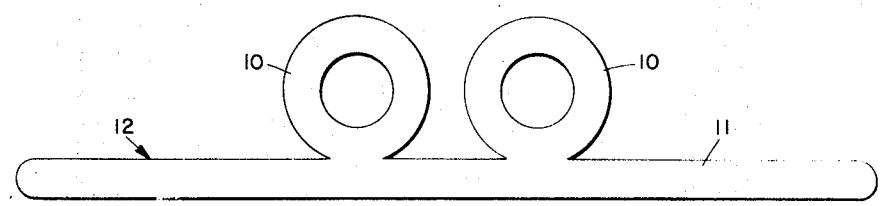
FIG. 1 is a front view of a combination of letters fixed to a base.

It is to be understood that any one of the above letters or combination of letters can be fixed to a base line such as the two letters 10 shown in FIG. 1 are attached to base 11. The entire element 12 shown in FIG. 1 is a unitary element which has the thickness of ordinary paper or of light-weight card board. Materials which may be used include plastics of various kinds, metal, cloth, felt among others. Generally, a material having kinesthetic appeal is chosen, and since felt usually has a pleasant hand and since it tends to adhere to itself, it is frequently used.

Figure 5:
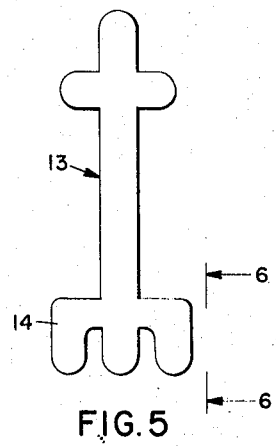
FIG. 5 illustrates a letter having at the end thereof a clipping mechanism which can be fixed to either the solid base shown in FIG. 1 or the notched base shown in FIG. 3.
Figure 6:
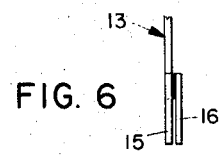
FIG. 6 is taken along lines 6—6 of FIG. 5 to show the clipping mechanism of the element given in FIG. 5.

In any event, the elements of this invention can be picked up and handled by the user. Generally, the teacher will have an element or set pattern 12 before him, and each of the pupils will have a similar element 12 so that the elements can be held up and discussed in full view of each other as the lesson progresses. The teacher can, for example, pick up a letter such as that shown in FIG. 5, designated as unit 13 which is the letter "t." It is to be noted that this unit has at the end of it a clipping mechanism designated as 14 which, as shown in FIG. 6, comprises two flat sections 15 and 16 between which the base line 11 will fit. Thus, the teacher can show the pupil not only what the letter "t" looks like but in a visual demonstration can fix the unit 13 onto the base line 11 of the element 12 so that the letter "t" is before the two letters shown in FIG. 1, thereby spelling a simple word, "too." Using the same set pattern, the teacher can pass on to similar words by selecting a "z" to spell out "zoo" or the letter "m" to spell "moo."

Figure 2:
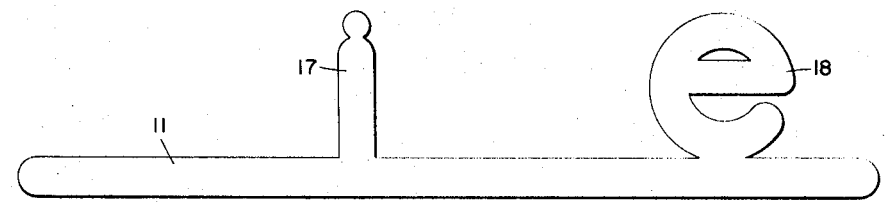
FIG. 2 illustrates the combination of letters having a space therebetween in which other letters may be placed in a fixed relationship to the base.
Figure 4:
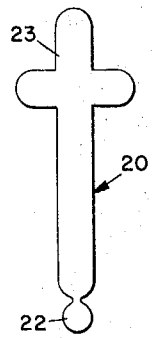
FIG. 4 illustrates a letter having at the end thereof a nodule which fits in the base shown in FIG. 3.
Figure 7:
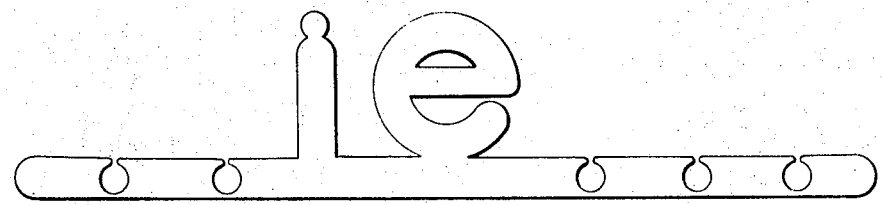
FIG. 7 is similar to FIG. 2 but shows the letters together and on a notched base.

In FIG. 7 there is shown attached to the notched, base line element 19 two different letters, 17 and 18, which are made for convenience to be the letter "i" and the letter "e," adapted to receive letters on either side. The teacher can place the tabbed unit 20 (FIG. 4) before the "i" and demonstrate the spelling of another simple word, "tie." Similarly, "l" can be selected to spell "lie" and so on. In FIG. 2, involving the non-notched base line 11 the letters "i" and "e" are separated enabling the teacher to select other letters having the same clip-on mechanism as unit 13, the "t" of FIG. 5. Assuming another such letter is "r," the teacher can very quickly and easily show the pupil how to place the "r" between letter 17 and letter 18 of FIG. 2 and spell the simple word "tire." Replacing the "t" with an "f," the student learns the spelling of "fire." It is to be noted that base line 19 of FIG. 7 is of a different kind than base line 11 of FIG. 2.

Figure 3:
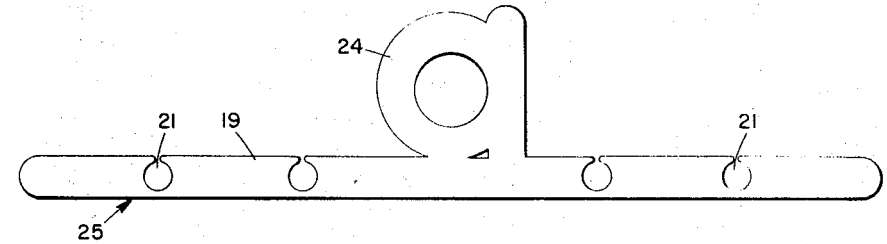
FIG. 3 illustrates another embodiment of this invention in which the base has recesses or notches adapted to receive co-acting parts of other letters.

This difference is further discussed with reference to FIG. 3. A base line 19 is shown which possesses a number of recesses or notches 21, each of which has a dimension corresponding to the dimensions of the tab or nodule or sphere 22 shown at the foot of unit 20 in FIG. 4. The notches and tabs are in effect tongue and groove holding means. It will be readily understood that letter 23 of FIG. 4, which is "t," can be placed immediately to the right of the letter 24 of element 25, which contains the letter "a," thereby spelling the simple word "at." The same short vowel sound can be learned by holding the students' usage to the specific pattern by spelling "bat," "cat," "fat," "hat" and the like or by first introducing "n" after the "a" to form "an" and then passing from it to "can," "ran," "fan" and the like.

Each of the various set patterns shown in the table above is attached to a base line of the type 11 or 19. In the table above, it is to be appreciated that the line under the given letter or letters represents a base line attached to the given letter or letters. There is room to the right or to the left of or inbetween the letters on the base line for the addition of one or more letters to form words. There are, however, instances in which the long vowel or the blend or other letters or groups will appear either at the very end of the base line element or at the very beginning. These arrangements are shown in the table above.

If the teacher wishes to spell the simple word "blue," an element bearing the blend "bl" (FIG. 8), which is not affixed to a base line, will be used in conjunction with the long vowel combination "ue" which is fixed to a base line, or vice versa. In other words, there is provided a plurality of letters or combination of letters which are not fixed to a base line but which can be temporarily placed into a holding relationship with a base line.

Figure 8:
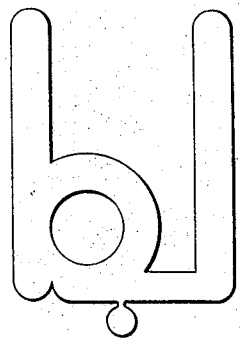
FIGS. 8 to 10 show different blends adapted to be fixed to a notched base.
Figure 9:
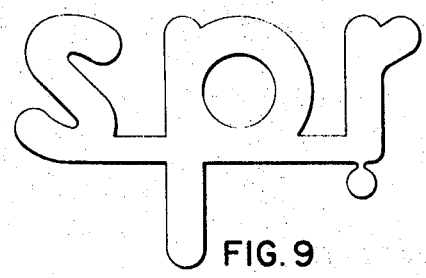
Figure 10:
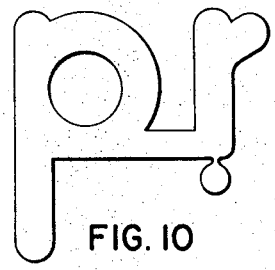
Figure 11:
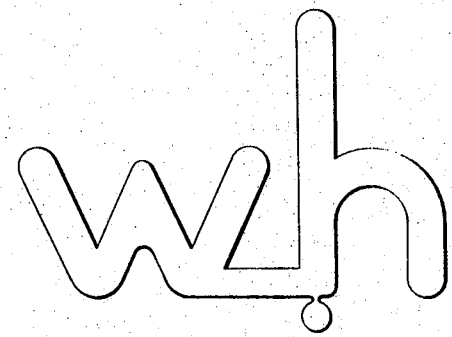
FIGS. 11 and 12 show different digraphs adapted to be fixed to a notched blend.
Figure 12:
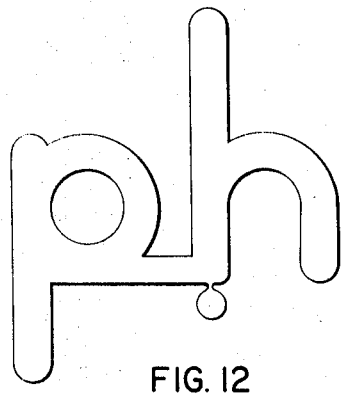
Figure 13:
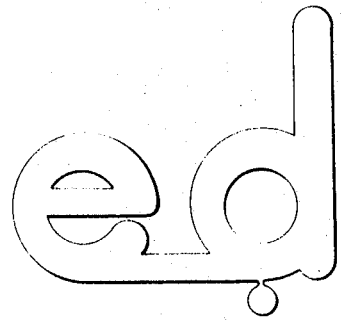
FIGS. 13 and 14 show different suffixes similarly adapted.
Figure 14:
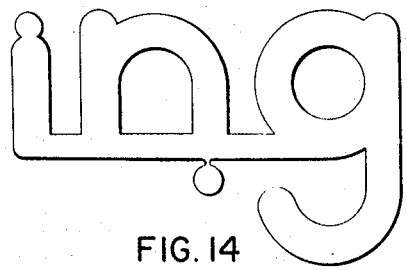
Figure 15:
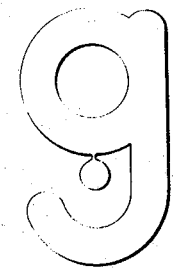
FIGS. 15 to 17 show different consonants similarly adapted.
Figure 16:
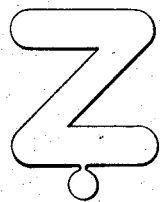
Figure 17:
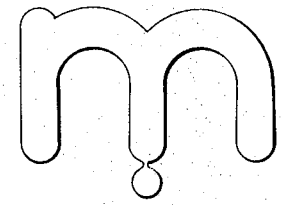

A number of letters that are not fixed to a base line are shown in the figures. For example, FIGS. 8 to 10 show different blends. FIGS. 11 and 12 show two different digraphs. FIGS. 13 and 14 show two suffixes, while FIGS. 15, 16 and 17 show a few consonants. All of these are shown to contain tabs to be fitted into notched base lines of the type 19. They can be provided with the clip-on mechanisms shown in FIG. 5 for use with a base line type 11. Further, it is to be appreciated that letters equipped with clip-on units 14 can be used with non-notched base lines of type 11. Still further, other mechanisms can be used for effecting the holding relationship. For example, pile fabrics or the like having fairly stiff pile can be placed on the various units, holding relationship being effected by pressing the facing pile together.

From the description above and the figures, it can be readily appreciated that a very large variety of words can be quickly formed by the teacher and the pupil. Very simple words can be formed and greater complexity can be obtained as the student progresses. Through the use of suffixes such as "ed," "ing," or "es" even greater complexity can be gotten.

The materials of which the elements of this invention are constructed are flexible and can be bent and can withstand long wear and tear. Further, their size affords their being readily handled and aligned. Each user has before him a sufficient number of letters and combinations of letters and a sufficient number of set patterns to make for a very large variety of words during the repeated sessions that a teacher and a pupil will have in the course of the pupil's learning to read and write.

Importantly, the learner relates sound directly to a readily visual object that he handles. This leads to rapid increases in perceptual ability and self-confidence. Thus, the learner is lead not only to new words suggested by the teacher but he is led to create new combinations for himself and learn whether or not what he has created is a word. The devices of this invention stimulate the learner to think, making the teaching task easier.

While the invention has been disclosed herein in connection with certain embodiments and certain structural and procedural details, it is clear that changes, modifications or equivalents can be used by those skilled in the art; accordingly, such changes within the principles of the invention are intended to be included within the scope of the claims below.

I claim:
1. An educational device comprising;
    a solid base structure representative of a horizontal line upon which a word is to be formed, said base having integral therewith and perpendicular to said line a letter or group of letters of substantially the same structural material of said base;
    and a plurality of similarly constructed letters or groups of letters which are non-integral with said base, said latter letters or groups of letters having attaching means to enable them to be attached to said base perpendicularly to said line in adjacent combination with said integral letter or group of letters to form said word.
2. An educational device in accordance with claim 1 in which said letter or said group of letters represents a specific sound used in speech.
3. An educational device in accordance with claim 1 in which the said attaching means comprises clip-on means.

4. An educational device in accordance with claim 1 in which the said attaching means comprises tongue and groove means.

5. A device in accordance with claim 1 in which said base has integral therewith indicia selected from the group consisting of a plurality of long vowels, short vowels, vowel variants, dipthongs, blends, digraphs, suffixes, prefixes and consonants.

6. A device in accordance with claim 1 in which nonintegral letter or groups of letters are selected from the group consisting of a plurality of long vowels, short vowels, vowel variants, dipthongs, blends, digraphs, suffixes, prefixes and consonants.

References Cited

UNITED STATES PATENTS

| 2,369,804 | 2/1945 | Schoolfield et al. | 35—35 H |
| 3,374,559 | 3/1968 | Smith, Jr. | 35—70 X |

FOREIGN PATENTS

| 140,790 | 4/1951 | Australia | 35—73 |

WILLIAM H. GRIEB, Primary Examiner

U.S. Cl. X.R.

35—71